United States Patent
Huang et al.

(10) Patent No.: US 9,495,049 B2
(45) Date of Patent: Nov. 15, 2016

(54) ELECTRONIC DEVICE WITH TOUCH SENSITIVE FUNCTIONALITY

(71) Applicant: HIMAX TECHNOLOGIES LIMITED, Tainan (TW)

(72) Inventors: Guan-Ying Huang, Tainan (TW); Yaw-Guang Chang, Tainan (TW); Chang-Hui Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 67 days.

(21) Appl. No.: 14/280,665

(22) Filed: May 18, 2014

(65) Prior Publication Data
US 2015/0331509 A1    Nov. 19, 2015

(51) Int. Cl.
G06F 3/041     (2006.01)
G06F 3/046     (2006.01)
G06F 3/0354    (2013.01)
G06F 3/044     (2006.01)

(52) U.S. Cl.
CPC ............ G06F 3/044 (2013.01); G06F 3/0416 (2013.01)

(58) Field of Classification Search
CPC ............ G09G 3/3648; G06F 3/03545; G06F 3/0383; G06F 3/044; G06F 2203/0384
See application file for complete search history.

(56) References Cited

U.S. PATENT DOCUMENTS

| | | | | |
|---|---|---|---|---|
| 2001/0001430 A1* | 5/2001 | Ely | .................. | G01D 5/2073 178/18.03 |
| 2007/0055473 A1* | 3/2007 | McLeod | .................. | G01K 1/00 702/130 |
| 2010/0071482 A1* | 3/2010 | Graumann | .............. | G01L 1/205 73/862.381 |
| 2011/0018626 A1* | 1/2011 | Kojima | ................ | H03D 7/1458 329/306 |
| 2014/0028577 A1* | 1/2014 | Krah | ..................... | G06F 3/0416 345/173 |

FOREIGN PATENT DOCUMENTS

| | | |
|---|---|---|
| TW | I436255 B | 5/2014 |
| TW | I436261 B | 5/2014 |

* cited by examiner

*Primary Examiner* — Lun-Yi Lao
*Assistant Examiner* — Ibrahim Khan
(74) *Attorney, Agent, or Firm* — CKC & Partners Co., Ltd.

(57) ABSTRACT

The touch-sensitive apparatus includes a touch sensing area, an analog-to-digital converter and a mixer. The touch sensing area has sensing pixels for receiving a touching signal to generate inducted signals. The analog-to-digital converter converts the inducted signals into digital signals. The mixer includes an in-phase multiplier, a quadrature multiplier, an in-phase summer, a quadrature summer and a Pythagorean operator. The in-phase multiplier multiplies each digital signal with a first reference signal to generate in-phase modulated signals. The quadrature multiplier multiplies each digital signal with a second reference signal to generate quadrature modulated signals. The in-phase summer respectively sums up elements of each modulated signal to generate in-phase values. The quadrature summer respectively sums up elements of each quadrature modulated signal to generate quadrature values. The Pythagorean operator performs a Pythagorean operation on each in-phase value and each quadrature value for determining a touch location information corresponding to the sensing pixels.

15 Claims, 6 Drawing Sheets

ELECTRONIC DEVICE WITH TOUCH SENSITIVE FUNCTIONALITY

BACKGROUND

1. Field of Invention

The invention relates to an electronic device, and more particularly, to an electronic device with touch sensitive functionality and related touch-sensitive apparatus and method.

2. Description of Related Art

Nowadays more and more electronic devices have touch control functionality to facilitate user operation. The touch screen of the electronic device receives a signal from an object, such as human finger or stylus, and then the control circuit of the electronic device process the signal, so as to determine a touch information such as touch location information or pressure information. As for known stylus, two common types thereof are widely used. One is called as "active stylus," which is operative to transmit a touching signal generated by itself and without being excited by the touch-sensitive apparatus of the electronic device. The other is called as "passive stylus," which is operative to transmit the touching signal in response to an excitation signal from the touch-sensitive apparatus.

However, regardless of the type of the known stylus, an additional synchronization circuit is required for synchronization between signals of the stylus and of the touch-sensitive apparatus, such that misdetermination of the touch information can be prevented. Moreover, in order to determine both the touch location information and the pressure information, two different signals need to be transmitted by the stylus, and extra circuits and time are needed to process such signals.

SUMMARY

The invention provides a touch-sensitive apparatus, a method thereof and an electronic device. Since no synchronization is required for determining a touch information, processing time and hardware cost can be saved. In addition, a touch location information and a pressure information of the touch information can be determined from the same touching signal and, therefore, signal transmission between an object and the touch-sensitive apparatus can be simplified.

An aspect of the invention is to provide a touch-sensitive apparatus. The touch-sensitive apparatus includes a touch sensing area, an analog-to-digital converter and a mixer. The touch sensing area has sensing pixels for receiving a touching signal from an object, thereby generating inducted signals. The analog-to-digital converter is configured to convert the inducted signals into digital signals. The mixer includes an in-phase multiplier, a quadrature multiplier, an in-phase summer, a quadrature summer and a Pythagorean operator. The in-phase multiplier is utilized for multiplying each of the digital signals with a first reference signal to generate in-phase modulated signals. The quadrature multiplier is utilized for multiplying each of the digital signals with a second reference signal to generate quadrature modulated signals, where the second reference signal is orthogonal to the first reference signal. The in-phase summer is utilized for respectively summing up elements of each of the in-phase modulated signals to generate in-phase values. The quadrature summer is utilized for respectively summing up elements of each of the quadrature modulated signals to generate quadrature values. The Pythagorean operator is utilized for performing a Pythagorean operation on each of the in-phase values and each of the quadrature values respectively corresponding to one of the in-phase values to obtain amplitude values for determining a touch location information corresponding to the sensing pixels.

In one or more embodiments, the mixer further includes an arctangent operator for performing an arctangent operation on each of the in-phase values and each of the quadrature values respectively corresponding to one of the quadrature values to obtain phase values for determining a pressure information corresponding to the sensing pixels.

In one or more embodiments, the touch-sensitive apparatus further includes a mapper for determining the pressure information based on the phase values and an initial value.

In one or more embodiments, the initial value is substantially the same as one of the phase values corresponding to a highest amplitude value of the amplitude values when the touch sensing area is untouched by the object.

In one or more embodiments, the touch-sensitive apparatus further includes a touch location determinator for determining the touch location information based on the amplitude values.

In one or more embodiments, the first and second reference signals are M-bit digital sinusoidal wave signals, where M is an integer.

In one or more embodiments, the touch-sensitive apparatus further includes a digital reference signal generator for generating the first and second reference signals.

In one or more embodiments, the digital reference signal generator includes a shifter for shifting the first reference signal to obtain the second reference signal.

In one or more embodiments, the touch-sensitive apparatus further includes an amplifier for amplifying the inducted signals.

In one or more embodiments, the analog-to-digital converter includes an N-bit quantizer for converting the inducted signals into the digital signals with N-bit, where N is an integer.

Another aspect of the invention is to provide a method for a touch-sensitive apparatus having a touch sensing area. In this method, a touching signal is received by sensing pixels of the touch sensing area, thereby generating inducted signals. The touching signal is generated from an object. The inducted signals are converted into digital signals. The digital signals are multiplied with a first reference signal to obtain in-phase modulated signals. The digital signals are multiplied with a second reference signal to obtain quadrature modulated signals. The first and second reference signals are orthogonal. Elements of each of the in-phase modulated signals are respectively summed up to generate in-phase values. Elements of each of the quadrature modulated signals are respectively summed up to generate quadrature values. A Pythagorean operation on each of the in-phase values and each of the quadrature values respectively corresponding to one of the in-phase values to obtain amplitude values is performed for determining a touch location information corresponding to the sensing pixels.

In one or more embodiments, the method further includes performing an arctangent operation on each of the in-phase values and each of the quadrature values respectively corresponding to one of the quadrature values to obtain phase values for determining a pressure information corresponding to the sensing pixels.

In one or more embodiments, the method further includes determining the pressure information based on the phase values and an initial value.

In one or more embodiments, the initial value is substantially the same as one of the phase values corresponding to a highest amplitude value of the amplitude values when the touch sensing area is untouched by the object.

In one or more embodiments, the method further includes determining the touch location information based on the amplitude values.

In one or more embodiments, the method further includes transmitting an excitation signal from the touch-sensitive apparatus to the object, where the touching signal is responsive to the excitation signal.

Another aspect of the invention is to provide an electronic device. The electronic device includes an object and a touch-sensitive apparatus. The object has an electric circuit operative to transmit a touching signal. The touch-sensitive apparatus includes a touch sensing area, an analog-to-digital converter and a mixer. The touch sensing area has sensing pixels for receiving the touching signal, thereby generating inducted signals. The analog-to-digital converter is configured to convert the inducted signals into digital signals. The mixer includes an in-phase multiplier, a quadrature multiplier, an in-phase summer, a quadrature summer and a Pythagorean operator. The in-phase multiplier is utilized for multiplying each of the digital signals with a first reference signal to generate in-phase modulated signals. The quadrature multiplier is utilized for multiplying each of the digital signals with a second reference signal to generate quadrature modulated signals, where the second reference signal is orthogonal to the first reference signal. The in-phase summer is utilized for respectively summing up elements of each of the in-phase modulated signals to generate in-phase values. The quadrature summer is utilized for respectively summing up elements of each of the quadrature modulated signals to generate quadrature values. The Pythagorean operator is utilized for performing a Pythagorean operation on each of the in-phase values and each of the quadrature values respectively corresponding to one of the in-phase values to obtain amplitude values for determining a touch location information corresponding to the sensing pixels.

In one or more embodiments, the mixer further includes an arctangent operator for performing an arctangent operation on each of the in-phase values and each of the quadrature values respectively corresponding to one of the quadrature values to obtain phase values for determining a pressure information corresponding to the sensing pixels.

In one or more embodiments, the object includes a power source for supplying power for the electric circuit to generate and transmit the touching signal.

In one or more embodiments, the touch-sensitive apparatus further includes a multiplexer for transmitting an excitation signal therefrom to the object, and the electric circuit of the object generates and transmits the touching signal in response to the excitation signal.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
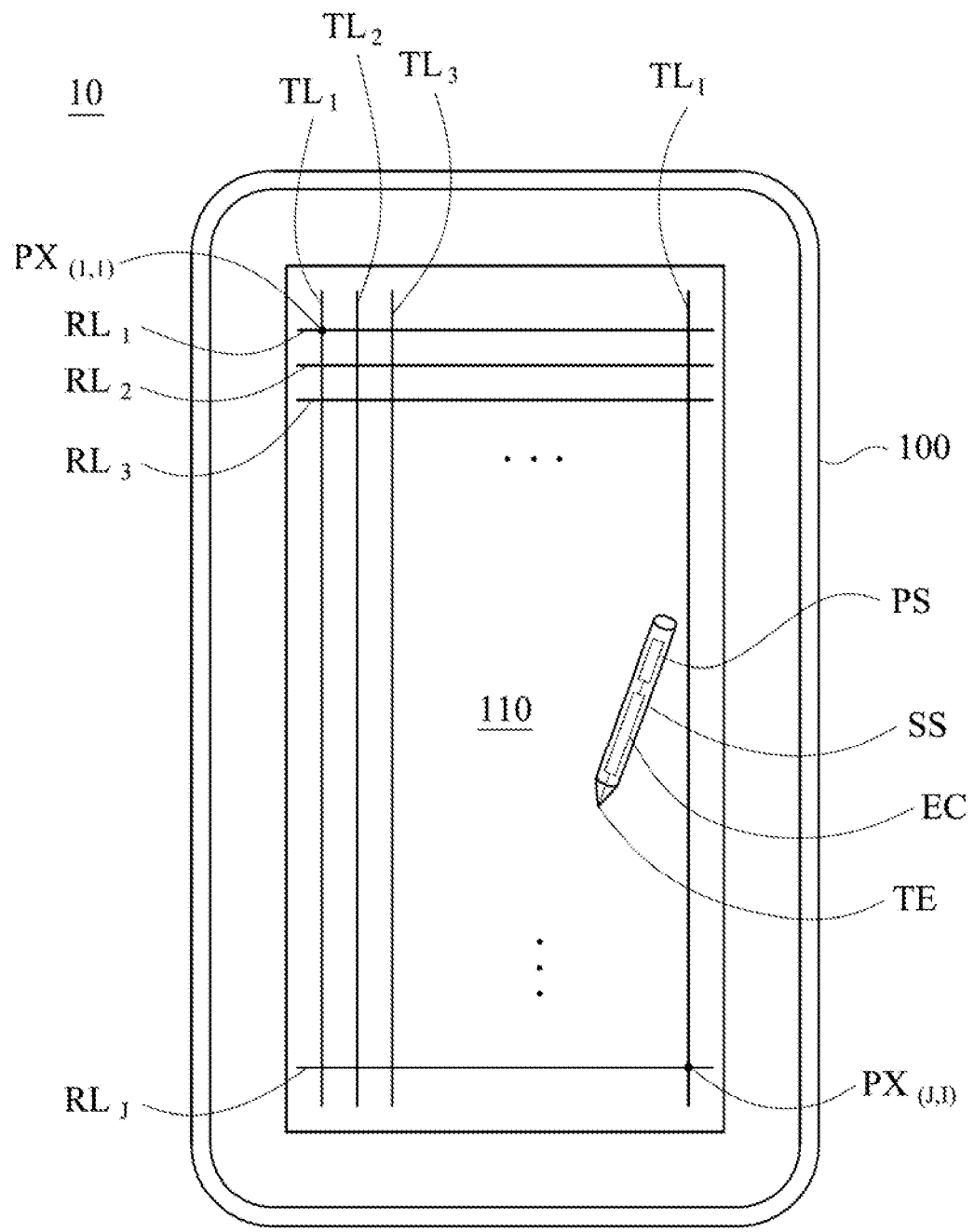
FIG. 1 illustrates an electronic device with a stylus according to some embodiments of the invention.

Reference will now be made in detail to the embodiments of the invention, examples of which are illustrated in the accompanying drawings. Wherever possible, the same reference numbers are used in the drawings and the description to refer to the same or like parts.

FIG. 1 illustrates an electronic device 10 according to some embodiments of the invention. The electronic device 10 includes a touch-sensitive apparatus 100 and a stylus SS. The touch-sensitive apparatus 100 may be a tablet, a notebook, a laptop PC, a LCD or OLED TV, a handset device or a GPS navigator including a display panel with touch sensing functionality, but is not limited thereto. The touch-sensitive apparatus 100 includes a touch sensing area 110 for receiving a touching signal transmitted from the stylus SS. In detail, the touch sensing area 110 may include transmit electrodes $TL_1$-$TL_J$ and receive electrodes $RL_1$-$RL_J$. Such transmit electrodes $TL_1$-$TL_J$ and receive electrodes $RL_1$-$RL_J$ are arranged to form an N×M matrix of sensing pixels $PX_{(1,1)}$-$PX_{(J,I)}$ for receiving the touching signal. The stylus SS includes an electric circuit EC for generating the touching signal, and for transmitting the touching signal via a tip TE. Further, in some embodiments, the stylus SS includes a power source PS for supplying power for the electric circuit EC to generate and transmit the touching signal. After receiving the touching signal, the sensing pixels $PX_{(1,1)}$-$PX_{(J,I)}$ of the touch sensing area generate inducted signals $IN_1$-$IN_L$ (L=J×I) accordingly, where each of the sensing pixels $PX_{(1,1)}$-$PX_{(J,I)}$ respectively corresponds to one of the inducted signals $IN_1$-$IN_L$. In some embodiments of the invention, the stylus SS may be alternatively substituted by other similar objects.

Figure 2:
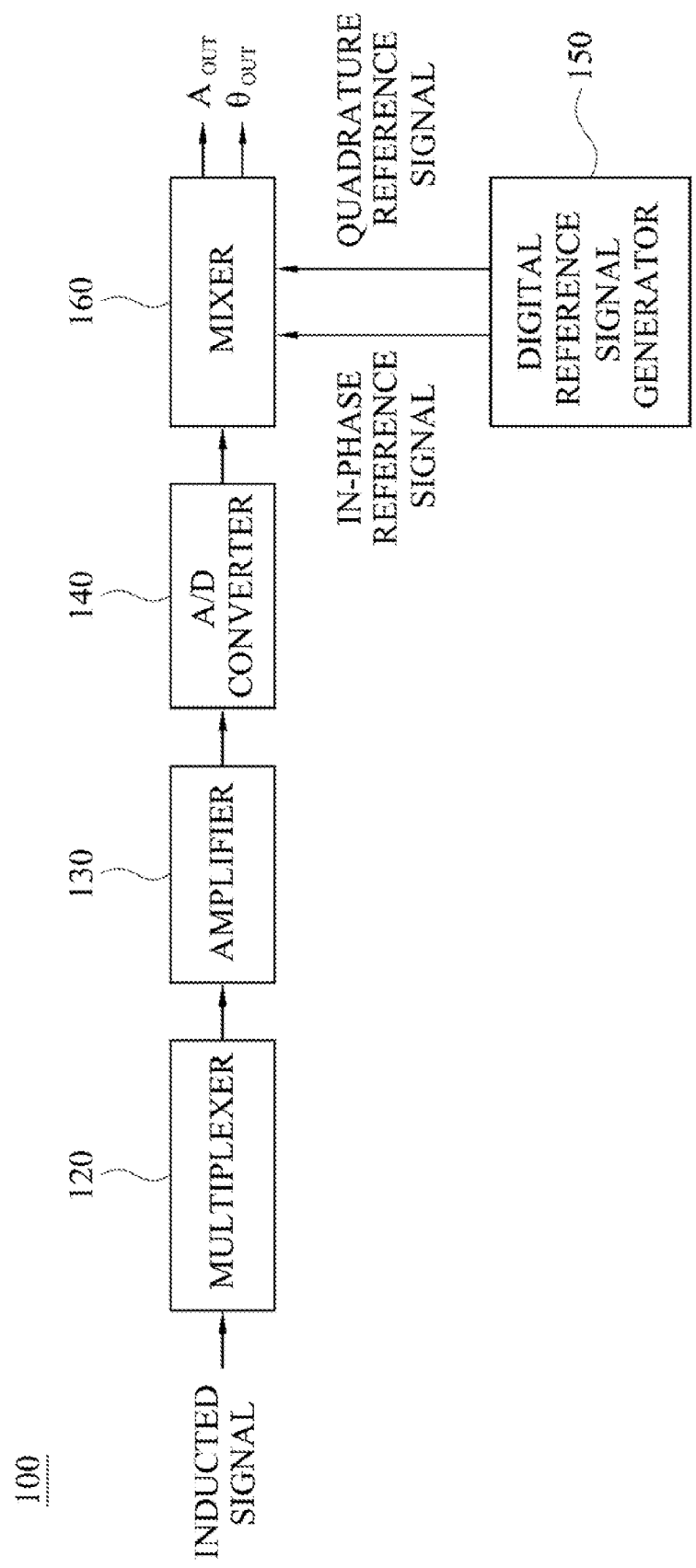
FIG. 2 illustrates a block diagram of the touch-sensitive apparatus of FIG. 1.

Also referring to FIG. 2, which illustrates a block diagram of the touch-sensitive apparatus 100 of FIG. 1. In addition to the touch sensing area 110 as shown in FIG. 1, the touch-sensitive apparatus 100 also includes a multiplexer 120, an amplifier 130, an analog-to-digital (A/D) converter 140, a digital reference signal generator 150 and a mixer 160.

The multiplexer 120 is electrically connected to sensing pixels $PX_{(1,1)}$-$PX_{(J,I)}$ of the touch sensing area 110. The operation of the multiplexer 120 is relative to the stylus SS which may be operated in active mode or passive mode. In detail, when the stylus SS is operated in active mode, the stylus SS generates the touching signal by itself. The multiplexer 120 only receives the inducted signals from the sensing pixels $PX_{(1,1)}$-$PX_{(J,I)}$, and does not transmit signal to the stylus SS. Oppositely, when the stylus SS is operated in passive mode, the stylus SS generates the touching signal in response to an excitation signal. Such excitation signal is generated by the multiplexer 120, and is transmitted via the touch sensing area 110.

The amplifier 130 is coupled to the multiplexer 120 for amplifying the inducted signals $IN_1$-$IN_L$, such that the amplitudes of the inducted signals $IN_1$-$IN_L$ can be high enough for follow-up operations. In some embodiments, the touch-sensitive apparatus 100 does not include the amplifier 130.

The A/D converter 140 is coupled to the amplifier 130 for converting the inducted signals $IN_1$-$IN_L$ into digital signals $DS_1$-$DS_L$. In some embodiments, the A/D converter 140 may include an N-bit quantizer (N is an integer) for converting the inducted signals into the digital signals each with N bits per touching signal.

The digital reference signal generator 150 is configured to generate an in-phase reference signal and a quadrature reference signal orthogonal to the in-phase reference signal. The in-phase and quadrature reference signals may be signed or unsigned. In some embodiments, the in-phase and quadrature reference signals are M-bit digital sinusoidal wave signals (M is an integer). In some embodiments, the digital reference signal generator 150 includes a shifter for shifting the in-phase reference signal by 90 degrees, thereby obtaining the quadrature reference signal.

Figure 3:
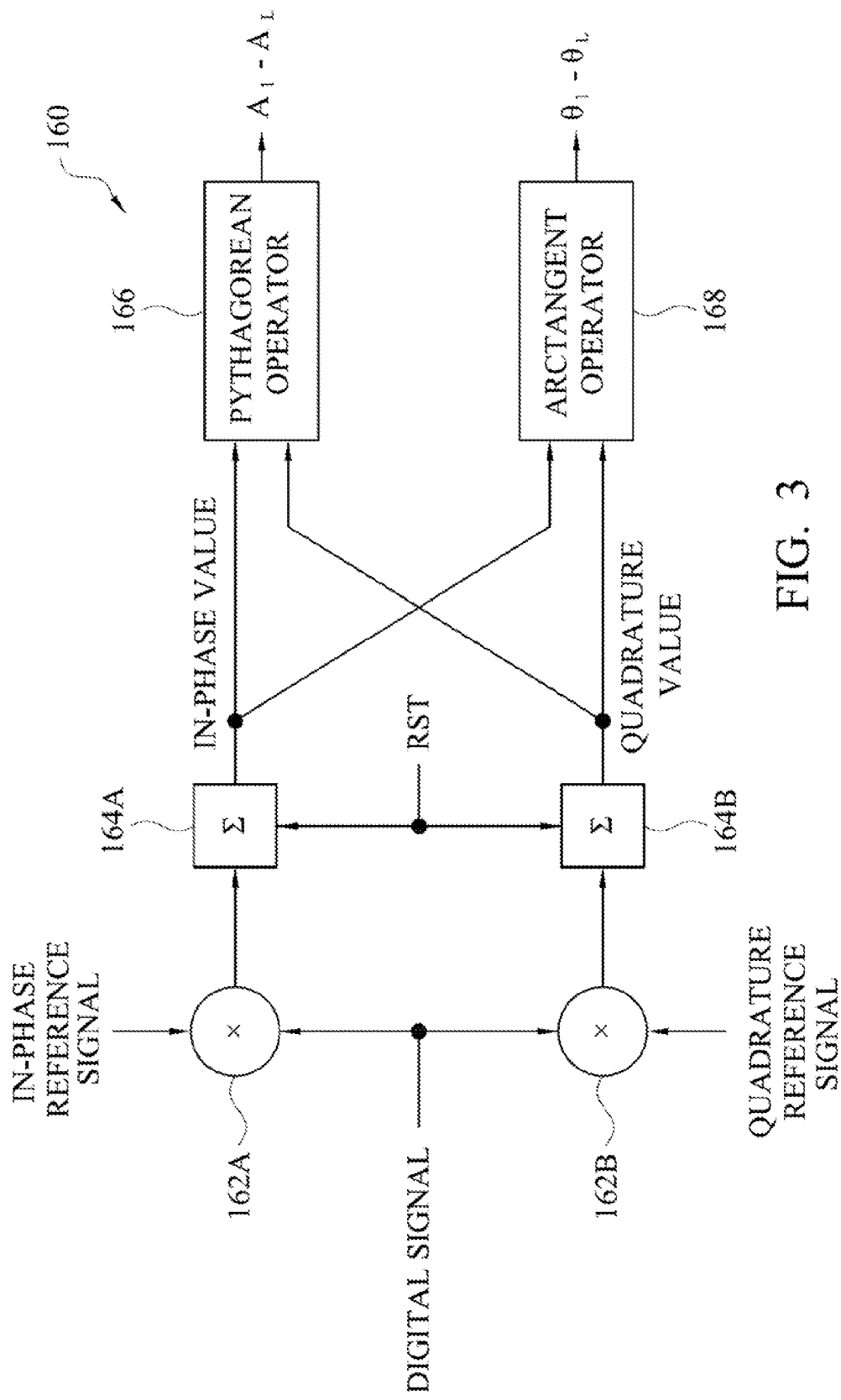
FIG. 3 illustrates a block diagram of the mixer of FIG. 2.

The mixer 160 is coupled to the A/D converter 140 and the digital reference signal generator 150. The mixer 160 is capable of signed or unsigned operation. Also referring to FIG. 3, which illustrates a block diagram of the mixer 160 of FIG. 2. In FIG. 3, the mixer 160 includes an in-phase multiplier 162A, a quadrature multiplier 162B, an in-phase summer 164A, a quadrature summer 164B, a Pythagorean operator 166 and an arctangent operator 168. The in-phase multiplier 162A receives the digital signals $DS_1$-$DS_L$ and the in-phase reference signal, and multiply each of the digital signals $DS_1$-$DS_L$ with the in-phase reference signal to generate in-phase modulated signals $MSI_1$-$MSI_L$. The quadrature multiplier 162B receives the digital signals $DS_1$-$DS_L$ and the quadrature reference signal, and multiply each of the digital signals $DS_1$-$DS_L$ with the quadrature reference signal to generate quadrature modulated signals $MSQ_1$-$MSQ_L$.

The in-phase summer 164A receives in-phase modulated signals $MSI_1$-$MSI_L$, and respectively sums up elements of each of the in-phase modulated signals $MSI_1$-$MSI_L$ to generate in-phase values $IV_1$-$IV_L$. The quadrature summer 164B receives the quadrature modulated signals $MSQ_1$-$MSQ_L$, and respectively sums up elements of each of the quadrature modulated signals $MSQ_1$-$MSQ_L$ to generate quadrature values $QV_1$-$QV_L$.

In some embodiments, the in-phase summer 164A and the quadrature summer 164B further receive a reset signal RST for resetting sum operations on the in-phase modulated signals $MSI_1$-$MSI_L$ and the quadrature modulated signals $MSQ_1$-$MSQ_L$, respectively. For example, if the in-phase modulated signals $MSI_1$-$MSI_L$ and the quadrature modulated signals $MSQ_1$-$MSQ_L$ are N-bit digital signals, the reset signal RST resets the in-phase summer 164A whenever all N elements of one of the in-phase modulated signals $MSI_1$-$MSI_L$ are summed, and resets the quadrature summer 164B whenever all N elements of one of the quadrature modulated signals $MSQ_1$-$MSQ_L$ are summed.

The Pythagorean operator 166 receives the in-phase values $IV_1$-$IV_L$ and the quadrature values $QV_1$-$QV_L$, and performs Pythagorean operations on the in-phase values $IV_1$-$IV_L$ and the quadrature values $QV_1$-$QV_L$ each respectively corresponding to one of the in-phase values $IV_1$-$IV_L$, so as to obtain amplitude values $A_1$-$A_L$. Specifically, the relationship among the in-phase values $IV_1$-$IV_L$, the quadrature values $QV_1$-$QV_L$ and the amplitude values $A_1$-$A_L$ is $$A_I = \sqrt{IV_I^2 + QV_I^2},$$

where I is an integer between 1 and L. The amplitude values $A_1$-$A_L$ represent strengths of the inducted signals $IN_1$-$IN_L$ generated by the sensing pixels $PX_{(1,1)}$-$PX_{(J,I)}$ in response to the touching signal. The highest amplitude value (e.g. $A_I$) among the amplitude values $A_1$-$A_L$ is determined to, either that the stylus SS touches an area corresponding to one sensing pixel (e.g. $PX_{(j,i)}$) among the sensing pixels $PX_{(1,1)}$-$PX_{(J,I)}$, or that the tip TE of the stylus SS is nearest to the sensing pixel $PX_{(j,i)}$.

The arctangent operator 168 receives the in-phase values $IV_1$-$IV_L$ and the quadrature values $QV_1$-$QV_L$, and performs arctangent operations on the in-phase values $IV_1$-$IV_L$ and the quadrature values $QV_1$-$QV_L$ each respectively corresponding to one of the in-phase values $IV_1$-$IV_L$ to obtain phase values $\theta_1$-$\theta_L$. Specifically, the relationship among the in-phase values $IV_1$-$IV_L$, the quadrature values $QV_1$-$QV_L$ and the phase values $\theta_1$-$\theta_L$ is $$\theta_I = \tan^{-1}(IV_I/QV_I),$$

where $\tan^{-1}(\cdot)$ denotes arctangent function. The phase values $\theta_1$-$\theta_L$ represent phases of the inducted signals $IN_1$-$IN_L$ generated by the sensing pixels $PX_{(1,1)}$-$PX_{(J,I)}$ in response to the touching signal.

Figure 4:
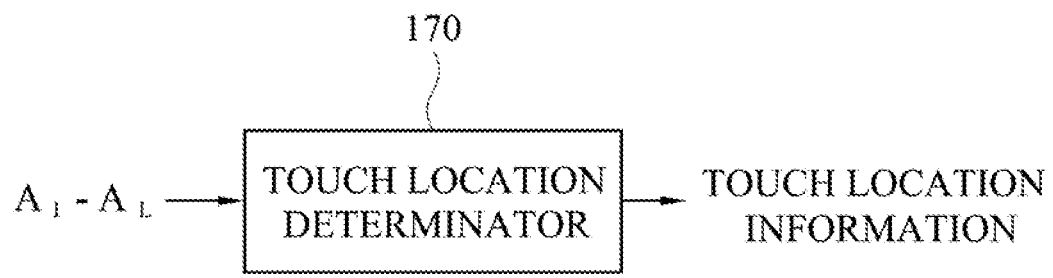
FIG. 4 is a diagram showing the touch location determinator of the touch-sensitive apparatus according to some embodiments of the invention.

In some embodiments of the invention, the touch-sensitive apparatus 100 further includes a touch location determinator. FIG. 4 is a diagram showing the touch location determinator 170 of the touch-sensitive apparatus 100. As shown in FIG. 4, the touch location determinator 170 receives the amplitude values $A_1$-$A_L$, and, determines a touch location information including which of the sensing pixels $PX_{(1,1)}$-$PX_{(J,I)}$ is closest to or touched by the tip TE of the stylus SS, based on the amplitude values $A_1$-$A_L$.

Figure 5:
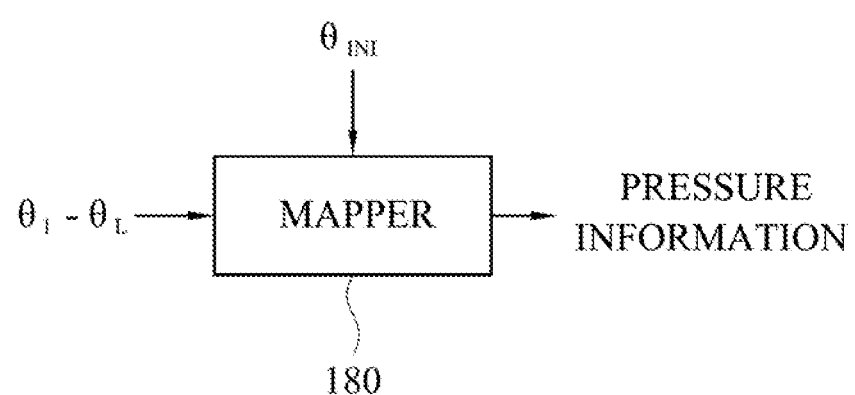
FIG. 5 is a diagram showing the mapper of the touch-sensitive apparatus according to some embodiments of the invention.

In some embodiments of the invention, the touch-sensitive apparatus 100 further includes a mapper. FIG. 5 is a diagram showing the mapper 180 of the touch-sensitive apparatus 100. As shown in FIG. 5, the mapper 180 receives the phase values $\theta_1$-$\theta_L$, and compares the phase values $\theta_1$-$\theta_L$ with an initial value $\theta_{INI}$, thereby determining a pressure information including the level of the pressure exerted on the touch sensing area 110.

Figure 6:
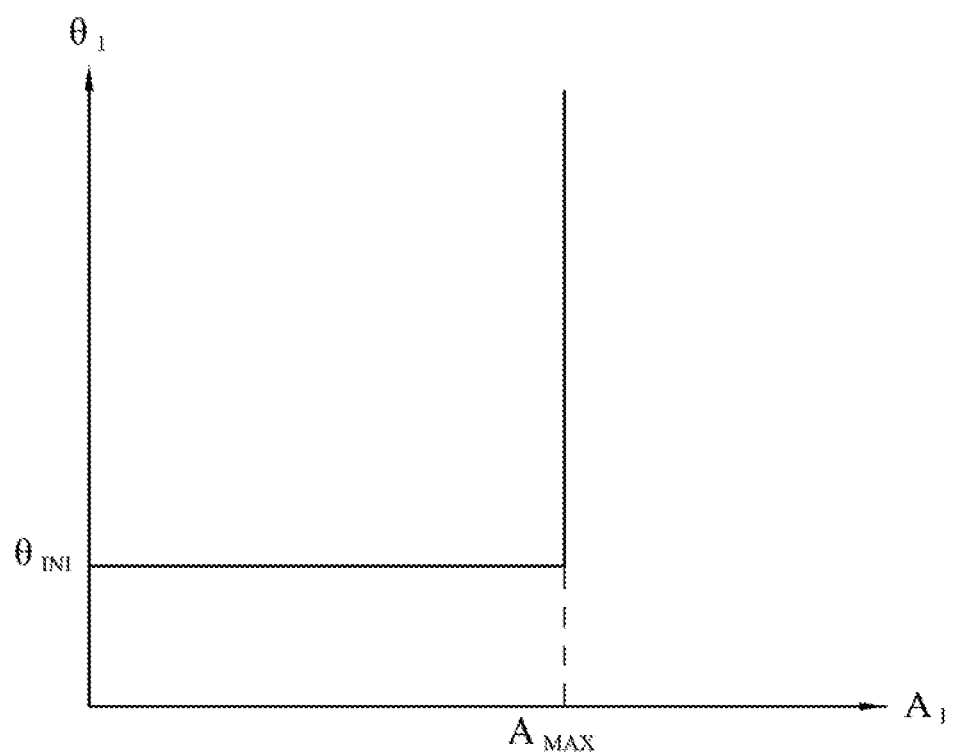
FIG. 6 is a diagram illustrating the relationship between the phase value and the amplitude value according to some embodiments of the invention.

In detail, please also refer to FIG. 6, which is a diagram illustrating the relationship between the phase value $\theta_I$ and the amplitude value $A_I$ according to some embodiments of the invention. In the case that the stylus SS does not touch the touch sensing area 110, the amplitude value $A_I$ is lower than the maximum amplitude value $A_{MAX}$, while the phase value $\theta_I$ is substantially the same as the initial phase value $\theta_{INI}$. When the stylus SS becomes closer to the touch sensing area 110, the amplitude value $A_I$ becomes larger but still lower than the maximum amplitude value $A_{MAX}$, while the phase value $\theta_I$ remains the same as the initial phase value $\theta_{INI}$. In the cast that the stylus SS touches the touch sensing area 110 instantaneously and without exerting pressure on the touch sensing area 110, the amplitude value $A_I$ is substantially the same as the maximum amplitude value $A_{MAX}$, and the phase value $\theta_I$ is substantially the same as the initial phase value $\theta_{INI}$. Next, when the stylus SS exerts pressure on the touch sensing area 110, the amplitude value $A_I$ remains the same as the maximum amplitude value $A_{MAX}$, while the phase value $\theta_I$ becomes larger as the exerted pressure increases.

Based on the aforementioned description about the relationship between the phase value $\theta_I$ and the amplitude value $A_I$ illustrated in FIG. 6, the pressure information can be determined.

Embodiments of the invention have at least the following advantages. First, the touching signal and the in-phase/quadrature reference signal can be unsynchronized. Since no synchronization is required in the electronic device, processing time and hardware cost for synchronization between the touching signal and the in-phase/quadrature reference signal can be saved. Second, the touch location information and the pressure information can be determined from the same touching signal instead of two different signals. Therefore, signal transmission between an object and the touch-sensitive apparatus can be simplified. In addition, embodiments of the invention can save power consumption.

Figure 7:
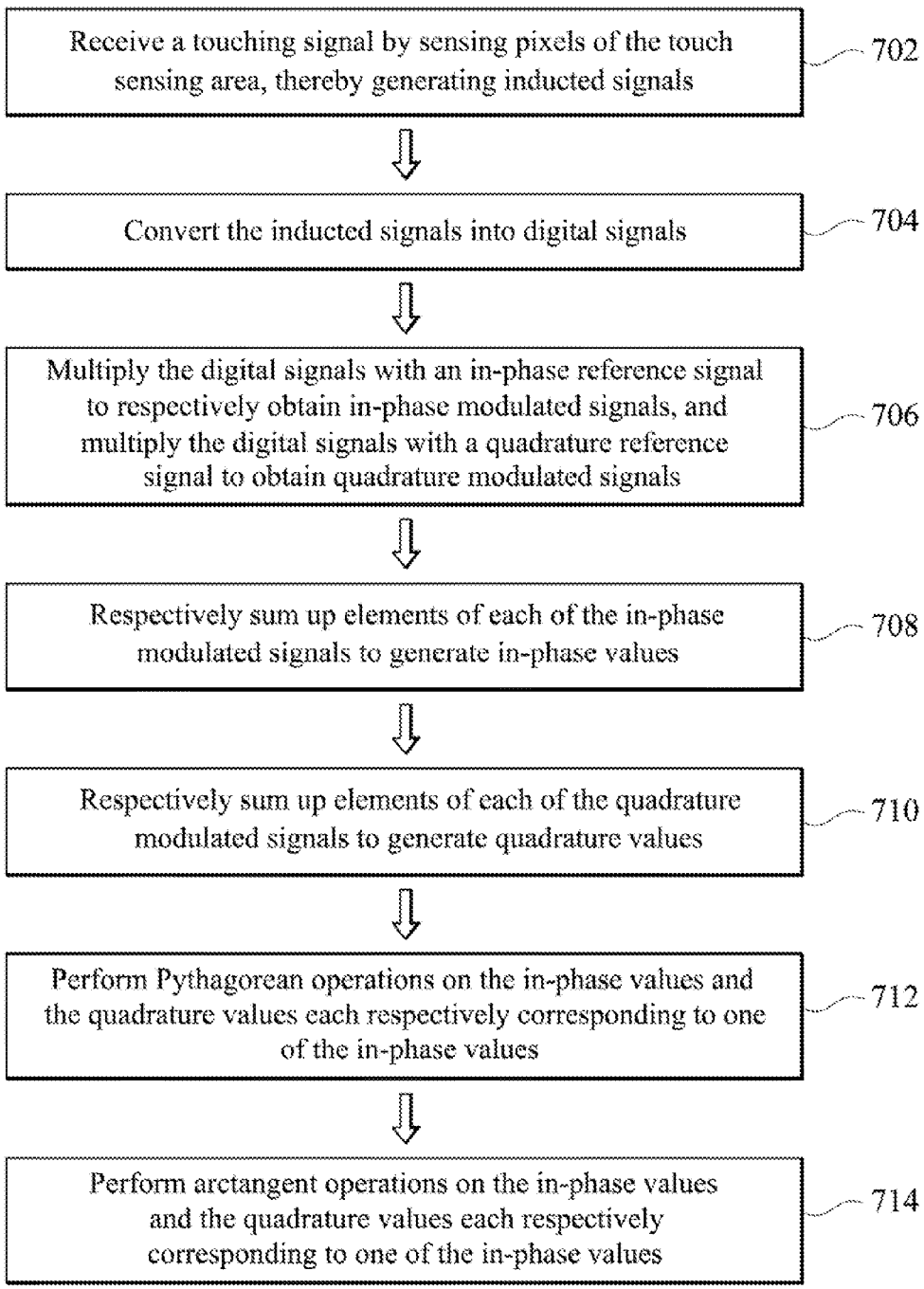
FIG. 7 is a flowchart diagram illustrating a method for a touch-sensitive apparatus according to some embodiments of the invention.

FIG. 7 is a flowchart diagram illustrating a method 700 according to some embodiments of the invention. The method 700 is operated in a touch-sensitive apparatus including a touch sensing area formed of sensing pixels for receiving a touching signal, so as to determine a touch information of the touch-sensitive apparatus. The touching signal is generated from an object such as stylus or human finger. The touch information may include a touch location information, a pressure information, or both. In some embodiments, the object may generate the touching signal by itself or in response to an excitation signal from the touch-sensitive apparatus.

The method 700 begins at operation 702, where the touching signal from the object is received by the sensing pixels, and the sensing pixels of the touch sensing area generate inducted signals according to the touching signal, where each of the sensing pixels respectively corresponds to one of the inducted signals.

At operation 704, the inducted signals are converted into digital signals. In some embodiments, the inducted signals is converted into the digital signals each with N bits per touching signal. In some embodiments, the inducted signals are amplified first before A/D conversion.

At operation 706, the digital signals are multiplied by an in-phase reference signal and a quadrature reference signal to respectively obtain in-phase modulated signals and quadrature modulated signals. The in-phase reference signal is orthogonal to the quadrature reference signal.

At operation 708, elements of the in-phase modulated signals are respectively summed up to generate in-phase values. In some embodiments, a reset signal is utilized resetting sum operations on the in-phase modulated signals. The sum operation on one of the in-phase modulated signals is reset whenever all elements of one of the in-phase modulated signal are summed up.

At operation 710, elements of the quadrature modulated signals are respectively summed up to generate quadrature values. In some embodiments, a reset signal is utilized resetting sum operations on the quadrature modulated signals. The sum operation on one of the quadrature modulated signals is reset whenever all elements of one of the quadrature modulated signal are summed up.

At operation 712, Pythagorean operations are performed on the in-phase values and the quadrature values each respectively corresponding to one of the in-phase values, so as to obtain amplitude values.

At operation 714, arctangent operations are performed on the in-phase values and the quadrature values each respectively corresponding to one of the in-phase values, so as to obtain phase values.

By performing the method 700, the amplitude and phase values can be obtained for determining a touch information of the touch-sensitive apparatus. The obtained amplitude values are used for determining the touch location information including which sensing pixel is closest to or touched by the object. In addition, the obtained phase values and an initial value are used for determining the pressure information including the level of the pressure exerted on the touch sensing area.

Although the invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A touch-sensitive apparatus, comprising:
 a touch sensing area having a plurality of sensing pixels for receiving a touching signal from an object, thereby generating a plurality of inducted signals;
 an analog-to-digital converter configured to convert the plurality of inducted signals into a plurality of digital signals; and
 a mixer comprising:
 an in-phase multiplier for multiplying each of the plurality of digital signals with a first reference signal to generate a plurality of in-phase modulated signals;
 a quadrature multiplier for multiplying each of the plurality of digital signals with a second reference signal to generate a plurality of quadrature modulated signals, wherein the second reference signal is orthogonal to the first reference signal;
 an in-phase summer for respectively summing up elements of each of the in-phase modulated signals to generate a plurality of in-phase values;
 a quadrature summer for respectively summing up elements of each of the quadrature modulated signals to generate a plurality of quadrature values;
 a Pythagorean operator for performing a Pythagorean operation on each of the in-phase values and each of the quadrature values respectively corresponding to one of the in-phase values to obtain a plurality of amplitude values for determining a touch location information corresponding to the plurality of sensing pixels;
 an arctangent operator for performing an arctangent operation on each of the in-phase values and each of the quadrature values respectively corresponding to one of the quadrature values to obtain a plurality of phase values; and
 a mapper for determining a pressure information corresponding to the plurality of sensing pixels based on the plurality of phase values, an initial value and a maximum amplitude value;
 wherein, when a highest amplitude of the plurality of amplitude values is substantially the same of the maximum amplitude value and one of the plurality of phase values corresponding to the highest amplitude value of the plurality of amplitude values is substantially larger than the initial value, the mapper determines a pressing value of the pressure information from the one of the plurality of phase values, wherein the pressing value is an amount of pressure exerted on the touch sensing area by the object; when the one of the plurality of phase values becomes larger, the pressing value determined by the mapper correspondingly becomes higher.

2. The touch-sensitive apparatus of claim 1, wherein the initial value is substantially the same as one of the plurality of phase values corresponding to a highest amplitude value of the plurality of amplitude values when the touch sensing area is untouched by the object.

3. The touch-sensitive apparatus of claim 1, further comprising a touch location determinator for determining the touch location information based on the plurality of amplitude values.

4. The touch-sensitive apparatus of claim 1, wherein the first and second reference signals are M-bit digital sinusoidal wave signals, wherein M is an integer.

5. The touch-sensitive apparatus of claim 1, further comprising a digital reference signal generator for generating the first and second reference signals.

6. The touch-sensitive apparatus of claim 5, wherein the digital reference signal generator comprises a shifter for shifting the first reference signal to obtain the second reference signal.

7. The touch-sensitive apparatus of claim 1, further comprising an amplifier for amplifying the plurality of inducted signals.

8. The touch-sensitive apparatus of claim 1, wherein the analog-to-digital converter comprises an N-bit quantizer for converting the plurality of inducted signals into the plurality of digital signals with N-bit, wherein N is an integer.

9. A method for a touch-sensitive apparatus having a touch sensing area, comprising:
receiving a touching signal by a plurality of sensing pixels of the touch sensing area, the touching signal generated from an object, thereby generating a plurality of inducted signals;
converting the plurality of inducted signals into a plurality of digital signals;
multiplying the plurality of digital signals with a first reference signal to obtain a plurality of in-phase modulated signals, and multiplying the plurality of digital signals with a second reference signal to generate a plurality of quadrature modulated signals, wherein the first and second reference signals are orthogonal;
respectively summing up elements of each of the plurality of in-phase modulated signals to generate a plurality of in-phase values;
respectively summing up elements of each of the plurality of quadrature modulated signals to generate a plurality of quadrature values;
performing a Pythagorean operation on each of the in-phase values and each of the quadrature values respectively corresponding to one of the in-phase values to obtain a plurality of amplitude values for determining a touch location information corresponding to the plurality of sensing pixels;
performing an arctangent operation on each of the in-phase values and each of the quadrature values respectively corresponding to one of the quadrature values to obtain a plurality of phase values; and
determining a pressure information corresponding to the plurality of sensing pixels based on the plurality of phase values, an initial value and a maximum amplitude value;
wherein, when a highest amplitude of the plurality of amplitude values is substantially the same of the maximum amplitude value and one of the plurality of phase values corresponding to the highest amplitude value of the plurality of amplitude values is substantially larger than the initial value, a pressing value of the pressure information is determined from the one of the plurality of phase values, wherein the pressing value is an amount of pressure exerted on the touch sensing area by the object; when the one of the plurality of phase values becomes larger, the determined pressing value correspondingly becomes higher.

10. The method of claim 9, wherein the initial value is substantially the same as one of the plurality of phase values corresponding to a highest amplitude value of the plurality of amplitude values when the touch sensing area is untouched by the object.

11. The method of claim 9, further comprising:
determining the touch location information based on the plurality of amplitude values.

12. The method of claim 9, further comprising:
transmitting an excitation signal from the touch-sensitive apparatus to the object, wherein the touching signal is responsive to the excitation signal values.

13. An electronic device, comprising:
an object having an electric circuit operative to transmit a touching signal; and
a touch-sensitive apparatus comprising:
a touch sensing area having a plurality of sensing pixels for receiving the touching signal, thereby generating a plurality of inducted signals;
an analog-to-digital converter configured to convert the plurality of inducted signals into a plurality of digital signals; and
a mixer comprising:
an in-phase multiplier for multiplying each of the plurality of digital signals with a first reference signal to generate a plurality of in-phase modulated signals;
a quadrature multiplier for multiplying each of the plurality of digital signals with a second reference signal to generate a plurality of quadrature modulated signals, wherein the second reference signal is orthogonal to the first reference signal;
an in-phase summer for respectively summing up elements of each of the in-phase modulated signals to generate a plurality of in-phase values;
a quadrature summer for respectively summing up elements of each of the quadrature modulated signals to generate a plurality of quadrature values;
a Pythagorean operator for performing a Pythagorean operation on each of the in-phase values and each of the quadrature values respectively corresponding to one of the in-phase values to obtain a plurality of amplitude values for determining a touch location information corresponding to the plurality of sensing pixels;
an arctangent operator for performing an arctangent operation on each of the in-phase values and each of the quadrature values respectively corresponding to one of the quadrature values to obtain a plurality of phase values; and
a mapper for determining the pressure information corresponding to the plurality of sensing pixels based on the plurality of phase values, an initial value and a maximum amplitude value;
wherein, when a highest amplitude of the plurality of amplitude values is substantially the same of the maximum amplitude value and one of the plurality of phase values corresponding to the highest amplitude value of the plurality of amplitude values is substantially larger than the initial value, the mapper determines a pressing value of the pressure information from the one of the plurality of phase values, wherein the pressing value is an amount of pressure exerted on the touch sensing area by the object; when the one of the plurality of phase values becomes larger, the pressing value determined by the mapper correspondingly becomes higher.

14. The electronic device of claim 13, wherein the object comprises a power source for supplying power for the electric circuit to generate and transmit the touching signal.

15. The electronic device of claim 13, wherein the touch-sensitive apparatus further comprises a multiplexer for transmitting an excitation signal therefrom to the object, and the electric circuit of the object generates and transmits the touching signal in response to the excitation signal.

* * * * *